United States Patent [19]
Hornbuckle

[11] Patent Number: 5,613,089
[45] Date of Patent: Mar. 18, 1997

[54] METHOD AND APPARATUS FOR REMOTELY CONTROLLING AND MONITORING THE USE OF COMPUTER SOFTWARE

[75] Inventor: Gary D. Hornbuckle, Pebble Beach, Calif.

[73] Assignee: SofTel, Inc., So. San Francisco, Calif.

[21] Appl. No.: 605,397

[22] Filed: Feb. 22, 1996

Related U.S. Application Data

[63] Continuation of Ser. No. 395,617, Feb. 28, 1995, Pat. No. 5,497,479, which is a continuation of Ser. No. 509,979, Apr. 20, 1990, abandoned, which is a continuation-in-part of Ser. No. 345,083, Apr. 28, 1989, abandoned.

[51] Int. Cl.⁶ ............................ G06F 13/00; G06F 12/14
[52] U.S. Cl. ........................................................ 395/491
[58] Field of Search ...................... 364/DIG. 1 MS File, 364/DIG. 2 MS File; 380/4; 395/401, 410, 411, 406, 49.1, 800

[56] References Cited

U.S. PATENT DOCUMENTS

| | | |
|---|---|---|
| 3,806,882 | 4/1974 | Clarke . |
| 3,996,449 | 12/1976 | Attanasio et al. . |
| 4,120,030 | 10/1978 | Johnstone . |
| 4,168,396 | 9/1979 | Best . |
| 4,361,851 | 11/1982 | Asip et al. ................. 358/84 |
| 4,439,830 | 3/1984 | Chueh . |
| 4,446,519 | 5/1984 | Thomas . |
| 4,458,315 | 7/1984 | Uchenick . |
| 4,471,163 | 9/1984 | Donald et al. ............ 364/200 |
| 4,503,287 | 3/1985 | Morris et al. ............ 178/220 |
| 4,593,376 | 6/1986 | Volk ............................ 364/900 |
| 4,635,055 | 8/1987 | Thomas ...................... 364/200 |
| 4,649,233 | 3/1987 | Bass et al. . |
| 4,652,990 | 3/1987 | Pailen et al. ............. 364/DIG. 1 |
| 4,658,093 | 4/1987 | Hellman .................... 380/25 |
| 4,691,355 | 9/1987 | Wirstrom et al. ........ 380/23 |
| 4,700,296 | 10/1987 | Palmer, Jr. et al. ..... 364/401 |
| 4,731,840 | 3/1988 | Mniszewski et al. .... 380/21 |
| 4,747,139 | 5/1988 | Taaffe ........................ 380/44 |
| 4,748,638 | 5/1988 | Friedman et al. ....... 375/8 |
| 4,827,508 | 5/1989 | Shear ......................... 380/4 |
| 4,916,738 | 4/1990 | Chandra et al. ......... 380/25 |
| 4,924,378 | 5/1990 | Hershey et al. ......... 364/DIG. 1 |
| 4,933,971 | 6/1990 | Bestock et al. ........... 380/44 |
| 4,941,175 | 7/1990 | Eneseu et al. ........... 380/4 |
| 4,949,257 | 8/1990 | Orbach ...................... 364/401 |
| 4,953,209 | 8/1990 | Ryder, Sr. et al. ...... 380/23 |
| 4,957,058 | 9/1990 | Izumi et al. .............. 395/600 |
| 4,972,470 | 11/1990 | Farago ....................... 380/3 |
| 4,975,865 | 12/1990 | Carrette et al. .......... 364/513 |
| 4,977,594 | 12/1990 | Shear ......................... 380/4 |
| 4,999,806 | 3/1991 | Chernow et al. ........ 364/900 |
| 5,047,928 | 9/1991 | Weidemer ................ 364/200 |
| 5,051,822 | 9/1991 | Rhoades .................... 358/86 |

FOREIGN PATENT DOCUMENTS

| | | |
|---|---|---|
| WO8502310 | 5/1985 | WIPO . |
| WO8503584 | 8/1985 | WIPO . |
| WO8802202 | 3/1988 | WIPO . |
| WO8802960 | 4/1988 | WIPO . |

*Primary Examiner*—Robert B. Harrell
*Attorney, Agent, or Firm*—LaRiviere, Grubman & Payne

[57] ABSTRACT

Remote control for the use of computer data and video game software is described in a system for renting computer software which derives use and billing information, prevents unauthorized use, maintains integrity of the software and controls related intercomputer communications. A user at a target game computer "downloads" programs or data, via a telephone line and remote control modules, from a central host computer. Usage of the video game software or data by the game computer or other accounting data are recorded and stored and, at predetermined times, the host computer "uploads" the usage data for processing. Other features include: (1) software and usage security for rental software programs; (2) a polynomial generator/checker for generating block check characters for assuring integrity of data transmitted and received; (3) a voice-data switch for switching between data communication and normal telephone communication; and (4) an audio amplifier and speaker for monitoring of activity on the communication line during data transfers.

20 Claims, 13 Drawing Sheets

FIG. 3A1

| FIG.3A1 | FIG.3A2 | FIG.3A3 |
| --- | --- | --- |
| FIG.3A4 | FIG.3A5 | FIG.3A6 |

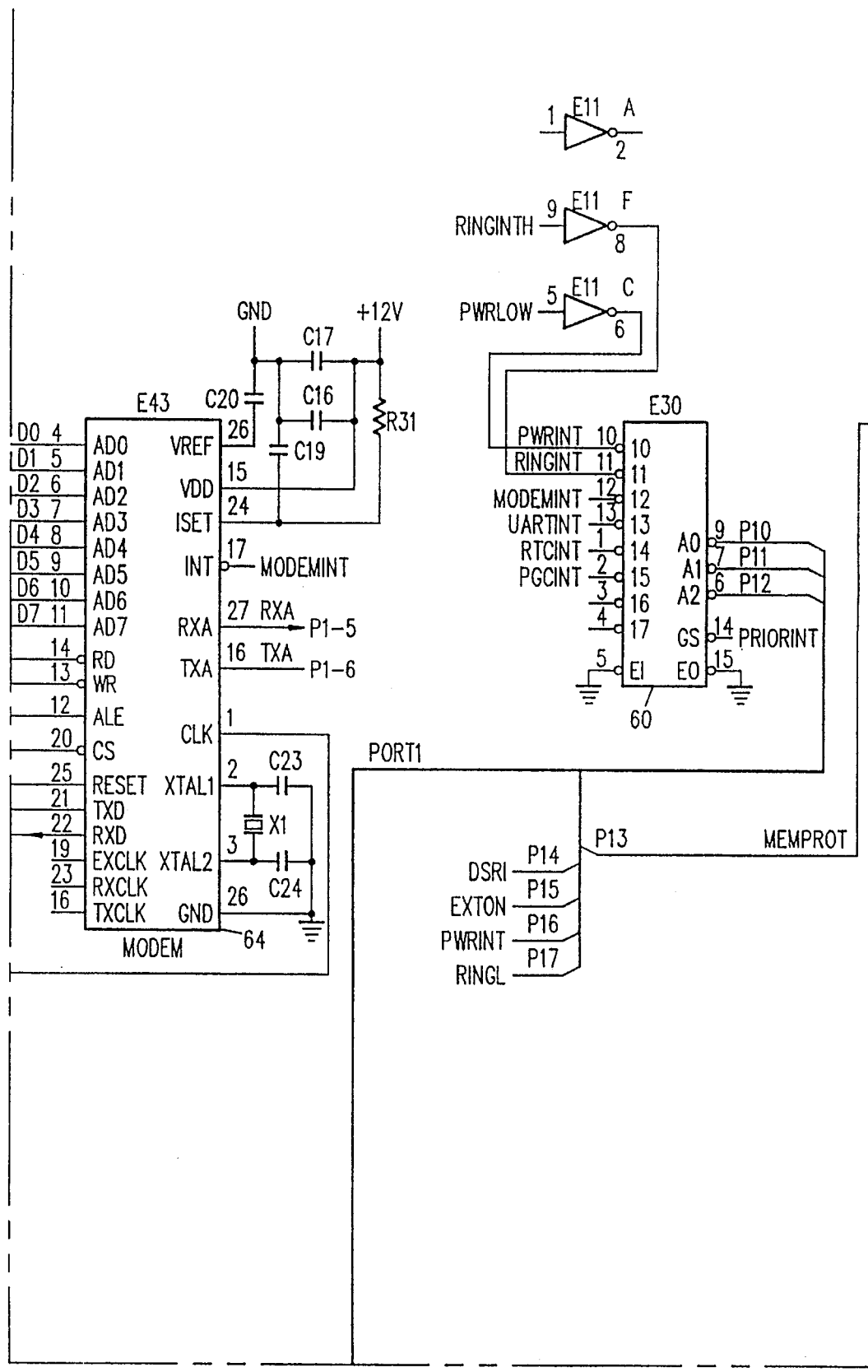
FIG. 3A2

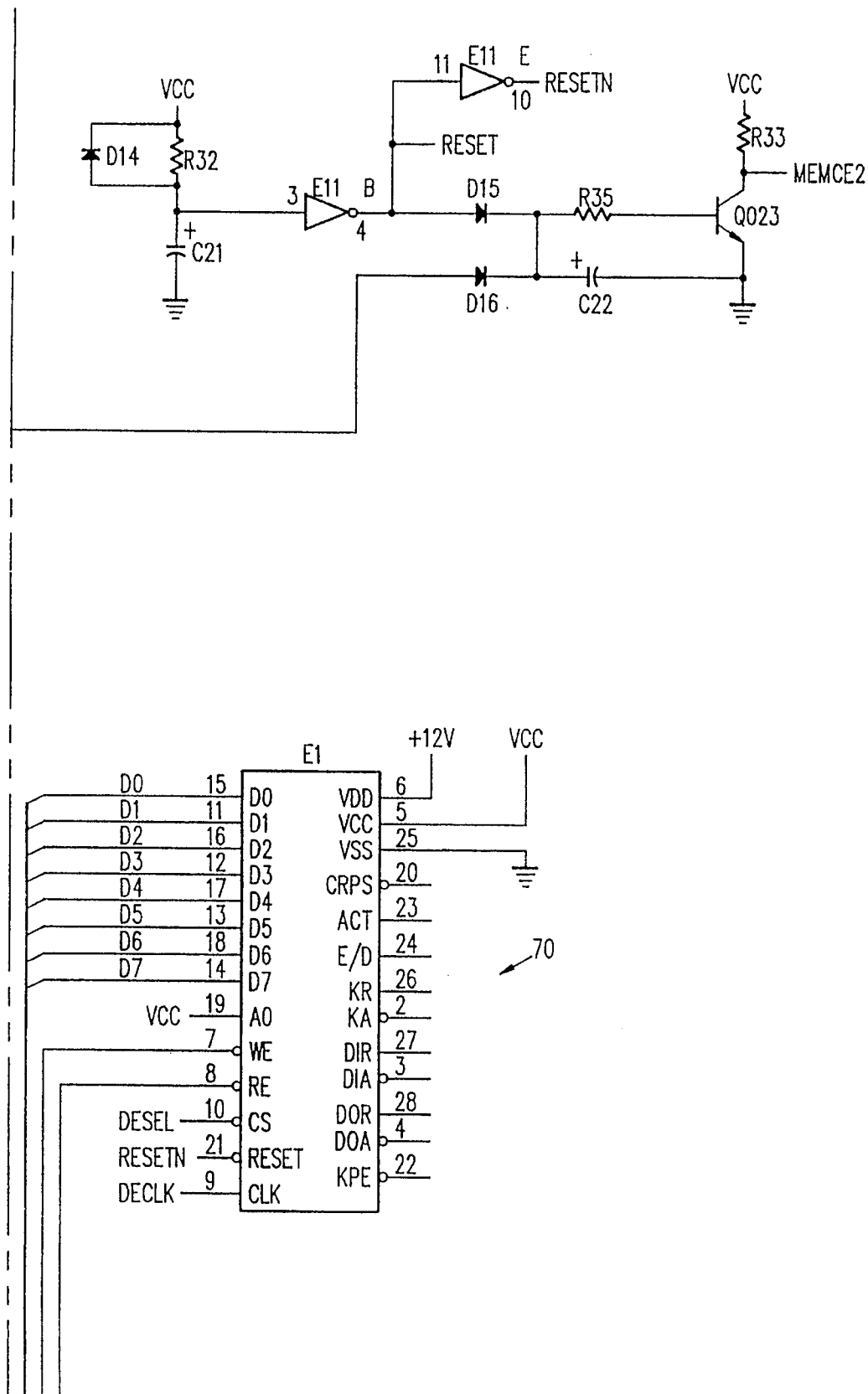
FIG. 3A3

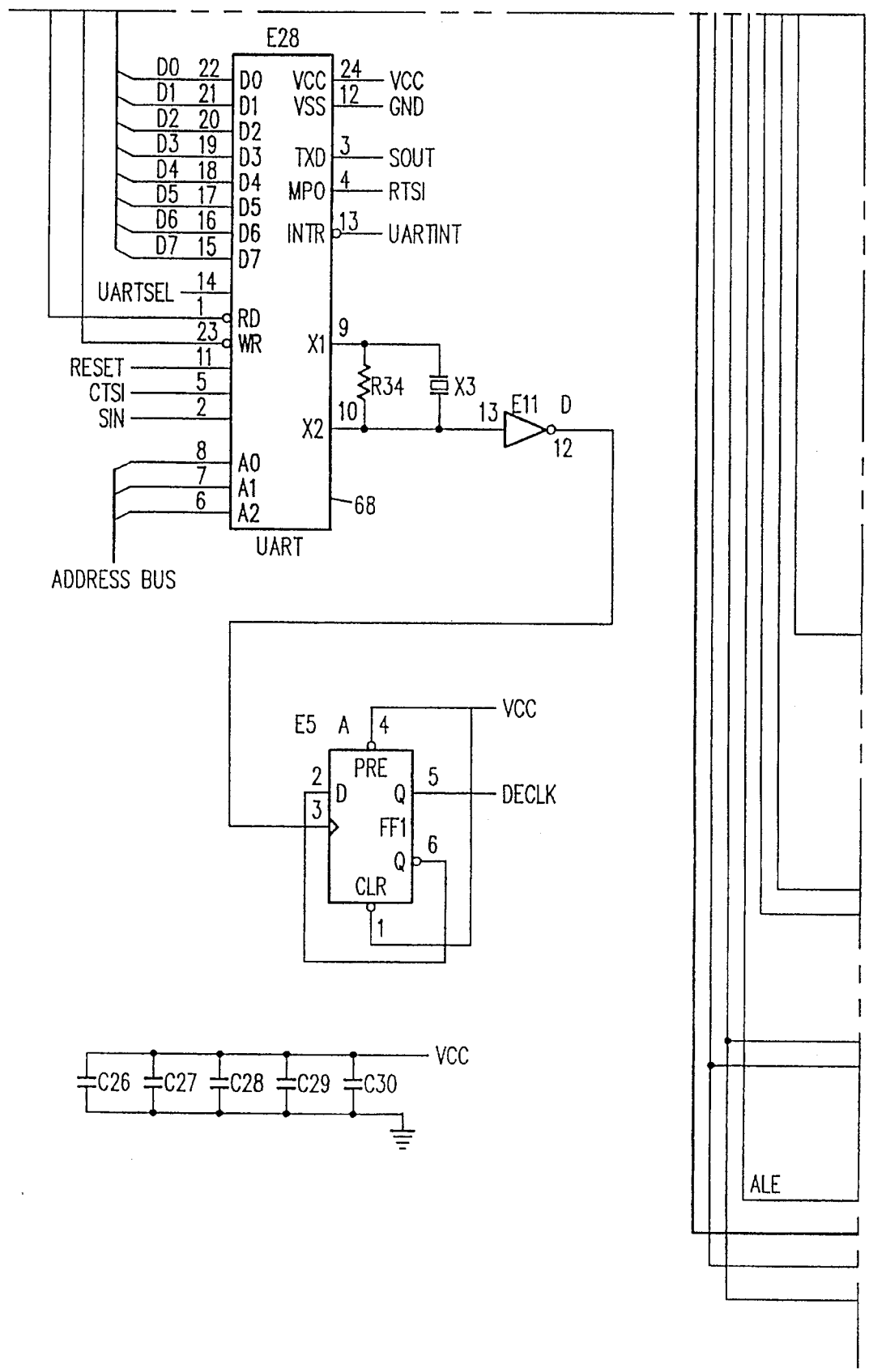
FIG. 3A4

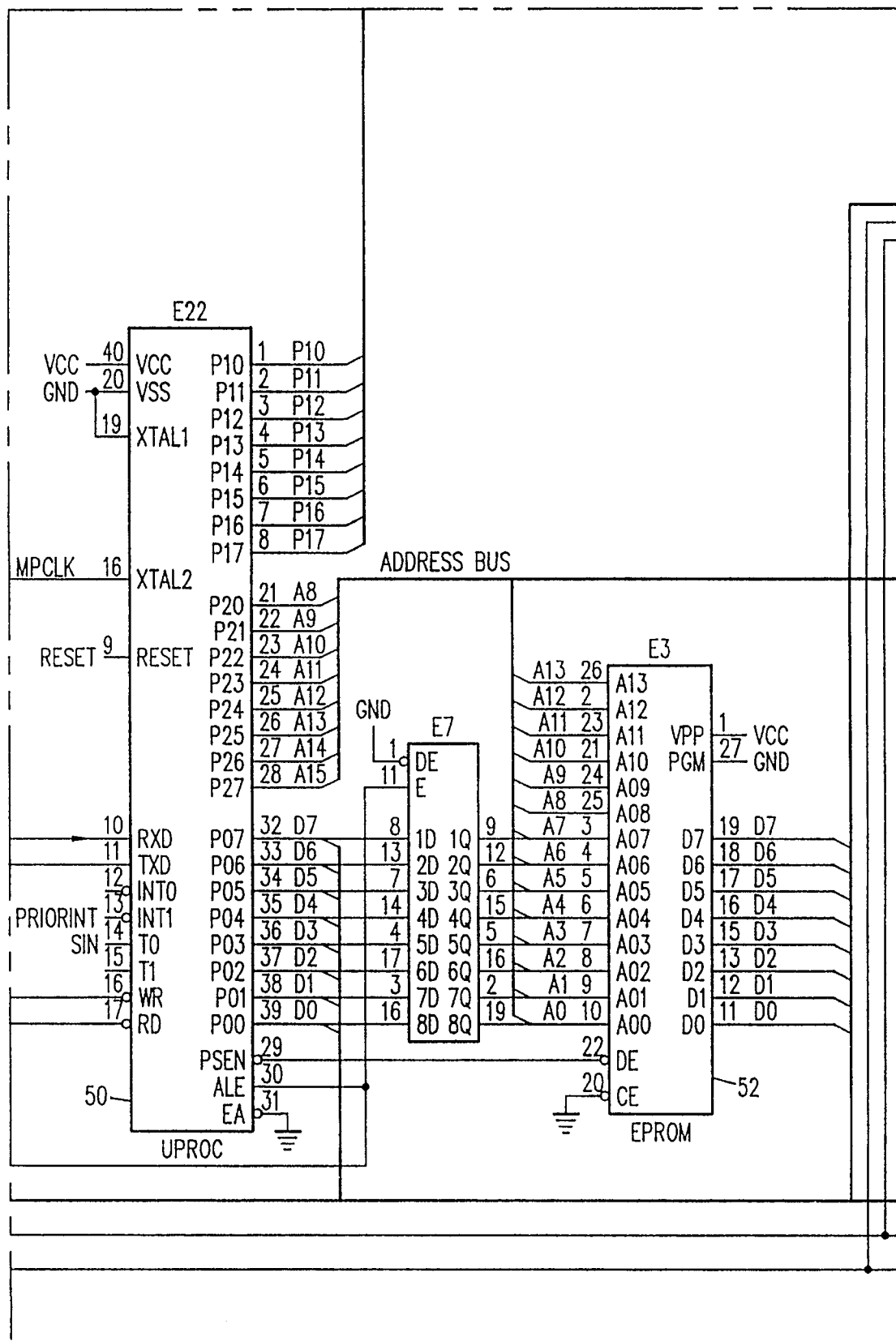
FIG. 3A5

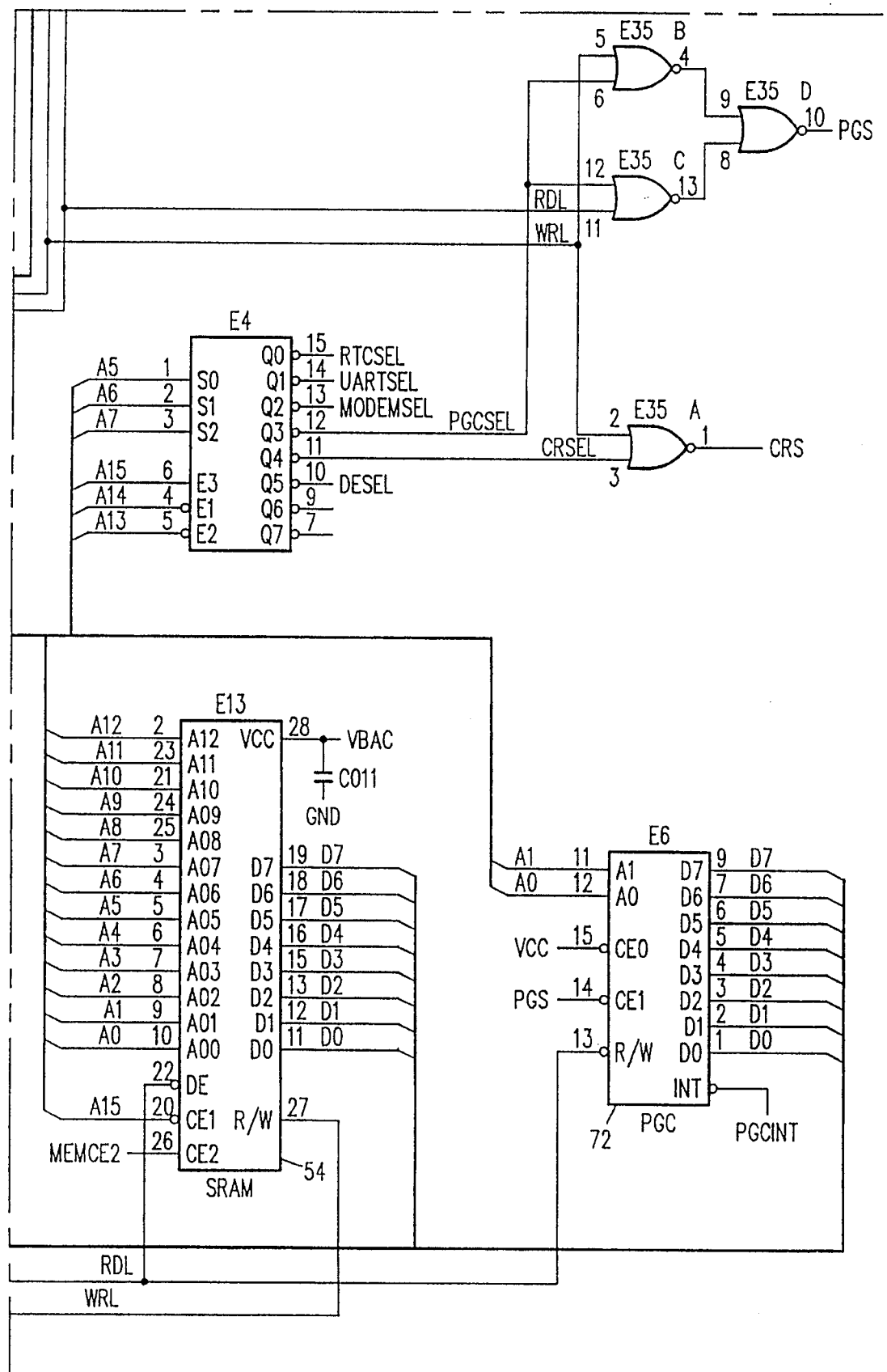
FIG. 3A6

FIG. 3B1

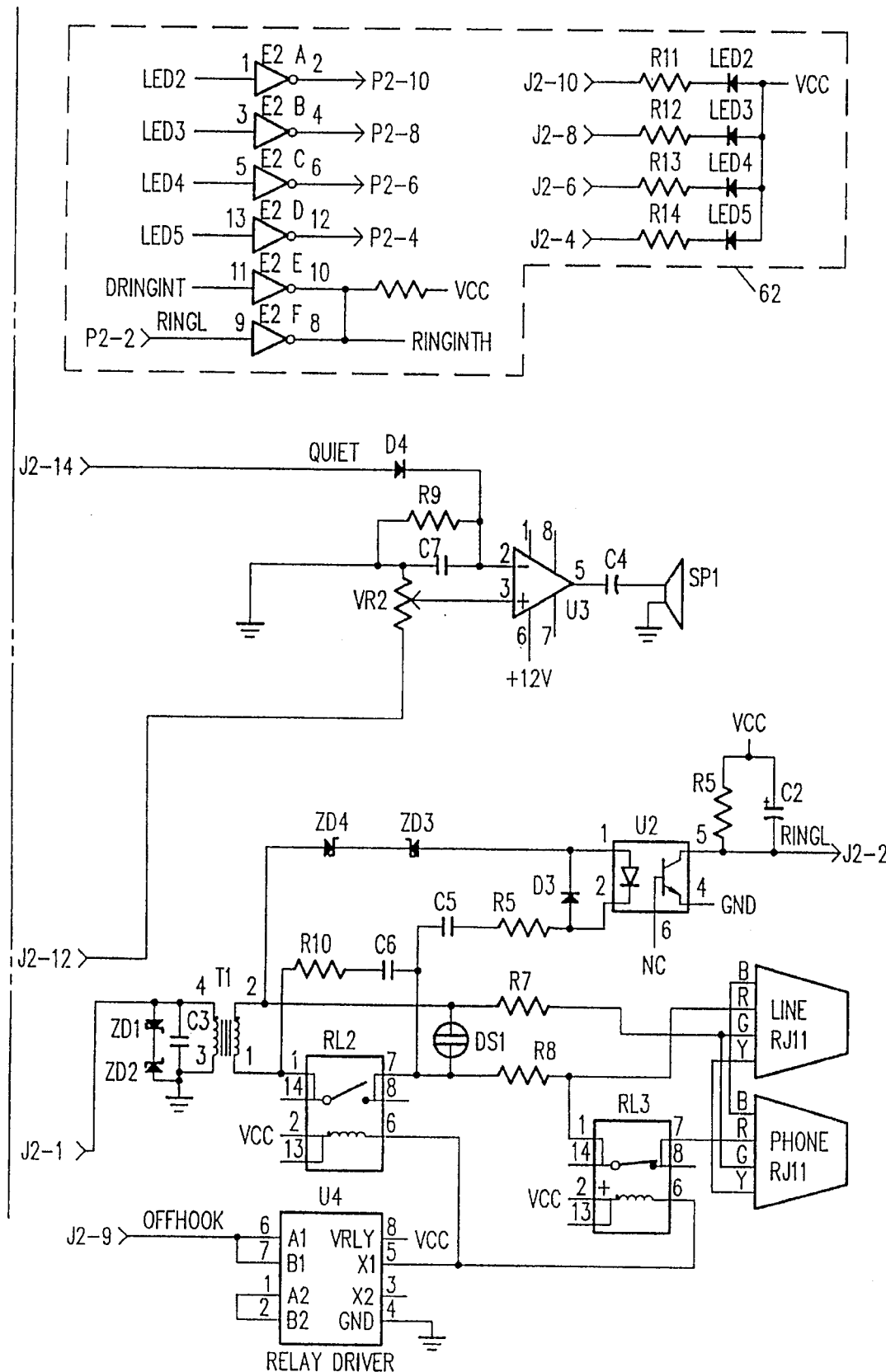
FIG. 3B2

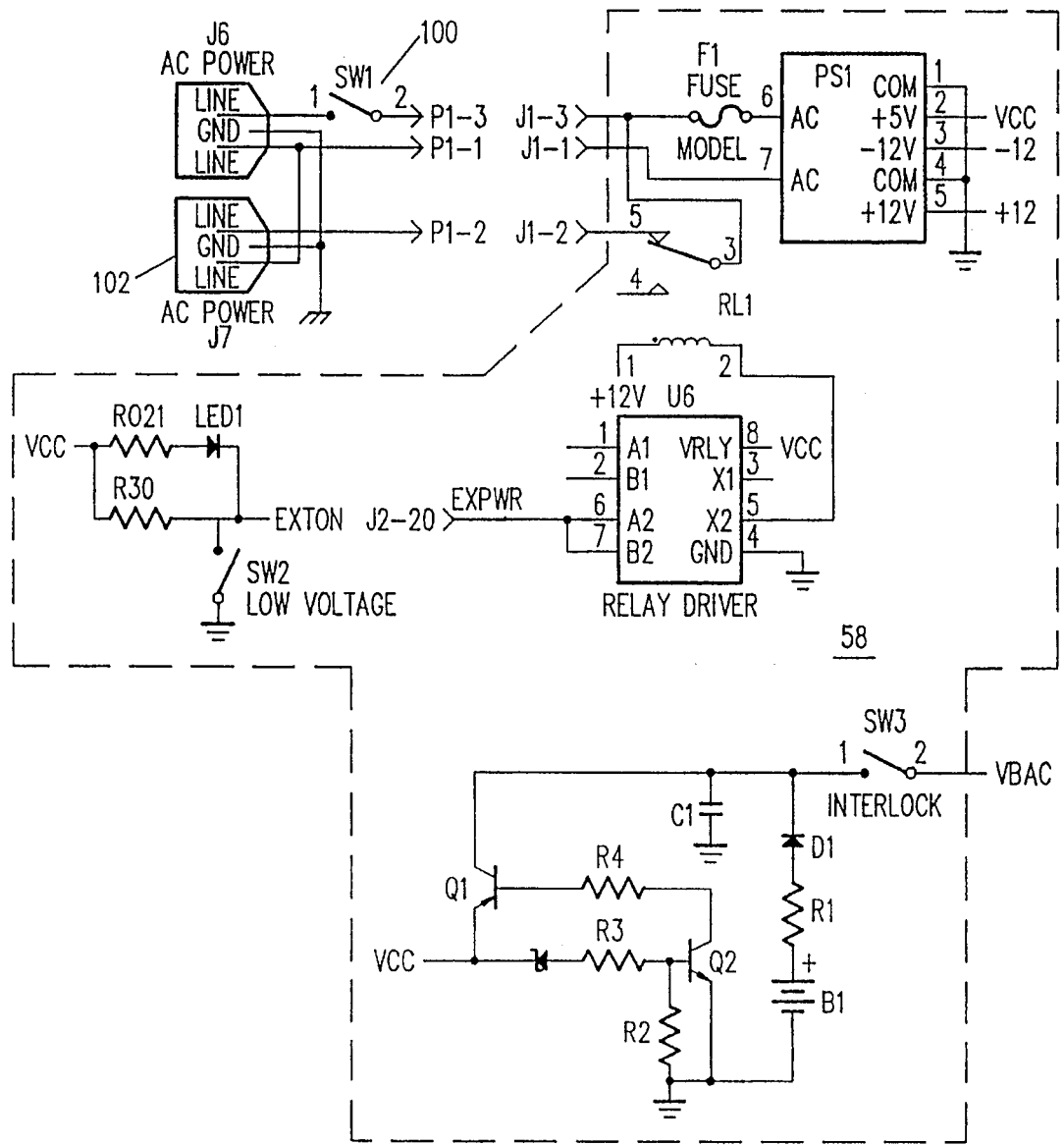
FIG. 3B3

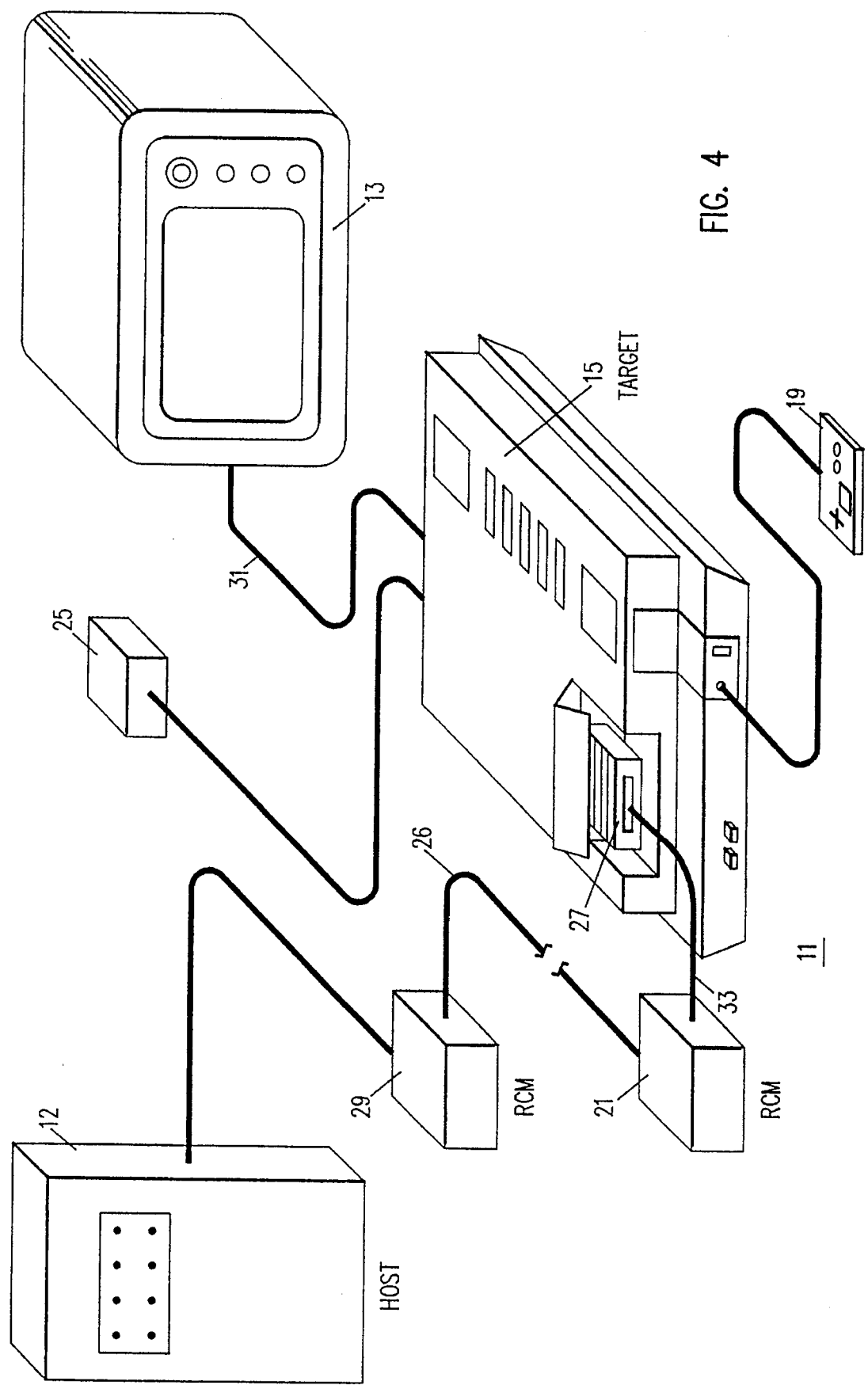

METHOD AND APPARATUS FOR REMOTELY CONTROLLING AND MONITORING THE USE OF COMPUTER SOFTWARE

This application is a continuation of application Ser. No. 08/395,617, filed Feb. 28, 1995, now U.S. Pat. No. 5,497,479, which is a continuation of application Ser. No. 07/509,979, filed Apr. 20, 1990, which is a continuation-in-part of application Ser. No. 07/345,083, filed Apr. 28, 1989, both of which are now abandoned.

BACKGROUND OF THE INVENTION

The present invention relates to remotely controlling and monitoring the use of computer software. More particularly, this invention relates to a system for renting computer software products while 1) deriving customer use and billing information; 2) preventing unauthorized copying and use; 3) maintaining the integrity of the rented software product (hereafter also "package"); and 4) controlling related voice, program and data communications between the host and user's computers.

For purposes of the present invention, rental computer software refers to the service of providing computer software to customers (hereafter also users) on a pay-as-used basis, where the software is executed on the customer's own personal computer. In the past, the only software offered for "rent" was software installed on centrally located computers, accessible via remotely located workstations or terminals. Such systems are well-known as "time-sharing" systems.

In time-share systems, software is executed on the central computer system, and not on the customer's own computer. Time-shared software is typically accessed over telephone networks using a "dumb" terminal or equivalent located at the customer's home or office. In such systems, all customers share the central computer resource, and the quality and delivery of services provided generally degrade, i.e., slow down, as more customers attempt to use the resource simultaneously. In addition to charges for the central computer to execute the users program (i.e. CPU time), charges for time-share usage must also include the cost for continuous use of the public telephone network for the duration of the connection to the central computer (i.e. connect time), whether or not the central computer is actually executing the user's program. Thus, as the number of users increase, both CPU time and connect time increase; as CPU time and connect time increase, charges escalate as service degrades.

In general, and particularly in the circumstances just described, charges for use of software via time-share systems are likely to be much greater and far less predictable than for the rental of software which is executed on the customer's own computer. On the other hand, host-based, time-share systems have successfully provided software that is too expensive or complex to be made available on smaller systems such as personal computers. Thus it is desirable to continue offering expensive and complex software installed on host-based systems, while eliminating the disadvantages of time-share systems.

The software rental system of the present invention has some features which are not unlike pay-for-view television systems enjoyed by television viewers today. In pay-for-view television systems, the customer generally pays to watch a particular program. For that purpose, the customer is provided with a control box supplied by a cable television company. The control box, once activated from the cable company office, decrypts encrypted television signals transmitted to the user by the cable company. If the customer is not authorized to view a particular program, the image remains scrambled, and is unintelligible to the viewer. Conversely, once the customer has selected and paid for the program desired, the control box decrypts the signal and the program is understandable by the viewer.

In the relevant prior art, U.S. Pat. No. 4,361,851 discloses a television usage monitoring system comprising a modified program selector (installed in the home of a subscriber) which is used to select television programs for viewing while, at the same time, providing the selection information to a remote monitoring unit (also installed in the subscriber's home). The remote monitoring unit is connected to the subscriber's telephone line and is programmed to periodically communicate, via telephone lines, with a central computer for the purpose of transmitting the television usage data thereto. The disclosed remote monitoring system can be utilized for "[a]ccess to centralized public database networks" (see column 2, line 4). The system is also described as having the capability of producing a "disable" signal from the central computer to the remote unit if, for example, the subscriber has not timely paid charges due on his account. It should be noted that U.S. Pat. No. 4,361,851 does not disclose a system for 1) secure and remotely controlled downloading and use of computer programs and data; 2) remotely controllable monitoring of use and security of the downloaded programs and data; and 3) accessing and retrieving stored usage data. In addition, neither means for generating block check characters for data transmitted and received, nor voice-data switching capability is described.

U.S. Pat. No. 4,624,578 discloses a rental contract timer system for operating a relay to connect power to the rental equipment such as a television set, only during the time for which rental has been paid. A magnetic card reader determines, from an inserted card, the rental period and identifying information, and the timer contains a real-time clock and a microprocessor to compare the current time with the time in the rental period.

In addition, U.S. Pat. No. 4,700,296 discloses an electronic access control system for controlling customer access to rental appliances located in the customer's home or other location away from the direct physical control of the renter. The system comprises a control module wired into the appliance with a card reader for programming the module to permit access and usage of the appliance by the customer.

SUMMARY OF THE INVENTION

In a software rental system according to the principles of the present invention, a control module is installed on or in cooperation with the customer's computer (hereafter also target computer), and the customer pays for services, i.e., the use of the software, received. While operation of the system is as convenient to use, substantially different features, advantages and implementation with respect to the corresponding television system are necessary and desirable. Specifically, the customer in a software rental system may rent any program of an entire library of computer programs at any time, rather than waiting for a particular time slot during which a particular program would be available. Moreover, it is not necessary to install a separate transmission system, such as a TV cable system, to access programs, since they are downloaded over conventional telephone lines. Finally, the software available for rent is not broadcast over the entire system, but rather individual programs are down-loaded to the user's system from the host only after selection by the user.

The control module used in the proposed software rental system performs many more functions than its counterpart in the pay-for-view television system. For example, it controls and verifies that use of a program is authorized; it records the actual time that the program is used; and it protects the rental program from theft, copying, vandalism or modification. In addition, facilities for communication via the telephone lines between the control module installed at the user's site and the central or host computer are provided.

A software rental system according to the present invention is also efficient and highly automated, for performing a number of overhead functions. At the same time, in order to maximize customer satisfaction, the overhead activities of the control module are essentially transparent to the user. Thus, for example, accounting and billing activities are automated to avoid the need for manual "meter readers", and other control operations conventionally involving a high degree of overhead expense are reduced or eliminated where possible.

By means of the present invention, an authorized user at the target computer is able to "download" programs or data, via a telephone line and a programmable remote control module (RCM) connected at each end thereof from a central or host computer. Usage and other accounting data are monitored by the RCM and stored in memory resident therein. At predetermined times, the central or host computer accesses the RCM for the purpose of "uploading" the usage and other accounting data to the central or host computer.

The RCM of the present invention also includes: (1) programmable modules for preventing unauthorized use, copying, vandalism and modification of downloadable data and programs during or after transmission to the target computer; (2) a polynomial generator/checker for generating block check characters for assuring the integrity of data and programs transmitted and received; (3) a voice-data switch for switching between data communication (with the central or host computer) and voice usage of the telephone line via the RCM; and (4) an audio amplifier and speaker so as to permit monitoring of activity on the communication line during data transfers by the RCM.

With the features listed above, the proposed system provides for error-free transmission of programs or other data between a host computer and a target computer, and for the secure transmission, reception and usage of programs or other data transferred between the host computer and the target computer. The audio amplifier and speaker can be used by the customer to monitor activity on the communication line during data transfers between the target and host computers. Finally, the RCM can be controlled to function as a conventional modem when conventional telecommunications service is desired. A voice/data selector switch is provided so that the user can select between voice and data communications.

The proposed software rental system has the capability to provide users with access to a wide range of software, including virtually all software that is sold for use on a personal computer. Thus, the system is particularly suited to the dissemination, on a pay-for-use basis, of otherwise expensive and complex software, such as certain engineering or scientific software, as well as certain financial accounting or tax programs.

The software rental system according to the present invention is further adaptable to the rental of video game software for use with well-known video game systems in combination with a home television set, for example, the well-known NINTENDO home video game computer systems. Desired video game software can be downloaded from a central or host computer by an authorized user via public telephone lines to the RCM which stores the game software for repeated use and monitors game usage. Since the game software is stored in the RCM memory, a telephone line connection is not required except to download additional game software and to transmit usage and other billing data to the host computer. A plug-in cartridge adapted to plug into a standard game cartridge slot provides the interface between the RCM and the video game system computer. A user makes a game selection via a joy stick or other input device provided with the video game system. For example, the host computer may transmit (i.e., download) a menu to be displayed on the user's television set screen providing a selection of games available for use. Additionally, the host computer may be utilized to transmit advertising and promotional material relating to new games and other services to be displayed with the game menu. Downloaded game software includes an encoded package identification number (PID) which is unique for each separate game software package. The PID is utilized for security of the software and to prevent unauthorized use of the game. Each use of the downloaded game software is internally recorded by the RCM and billed automatically by the host computer.

The system is also well-suited for allowing a customer to use moderately priced software on a rental basis to see if it really meets his needs. If satisfied, the software could be purchased, and marketing programs whereby the customer may apply some or all of the rental fees to the purchase price of the software could be devised. The proposed software rental system, therefore, offers software on a rental basis to new or low-usage customers at lower cost than would be otherwise incurred by purchase of the same software.

Rental software, as contemplated by the present invention, is less expensive than time-share software, and more convenient to use because execution is controlled by the user and unaffected by the number of other users. By eliminating the high initial cost of purchasing software and unpredictable cost and inconvenience of time-sharing, the number of users of a software rental system could be expected to grow indefinitely. Moreover, with more users becoming acquainted with various software products, the software industry as a whole would benefit, since the number of ultimate purchasers of the software would be likely to increase. Thus, with respect to both rental and purchase of software, the revenue of software vendors may be expected to increase.

The above and other objects, features and advantages, as will hereinafter appear, and the nature of the invention will be more fully understood by means of the detailed description set forth below, with reference to the associated drawings and the appended claims.

BRIEF DESCRIPTION OF THE DRAWINGS

FIGS. 3A, 3A1, 3A2, 3A3, 3A4, 3A5, 3A6, 3B, 3B1, 3B2 and 3B3 are circuit diagrams of the remote control module shown in FIG. 2.

FIG. 4 is a system diagram illustrating the use of the remote control module of the present invention with a video game system.

FIG. 5 is a block diagram of the remote control module shown in the video game system illustrated in FIG. 4.

DETAILED DESCRIPTION OF THE PREFERRED EMBODIMENT

Figure 1:
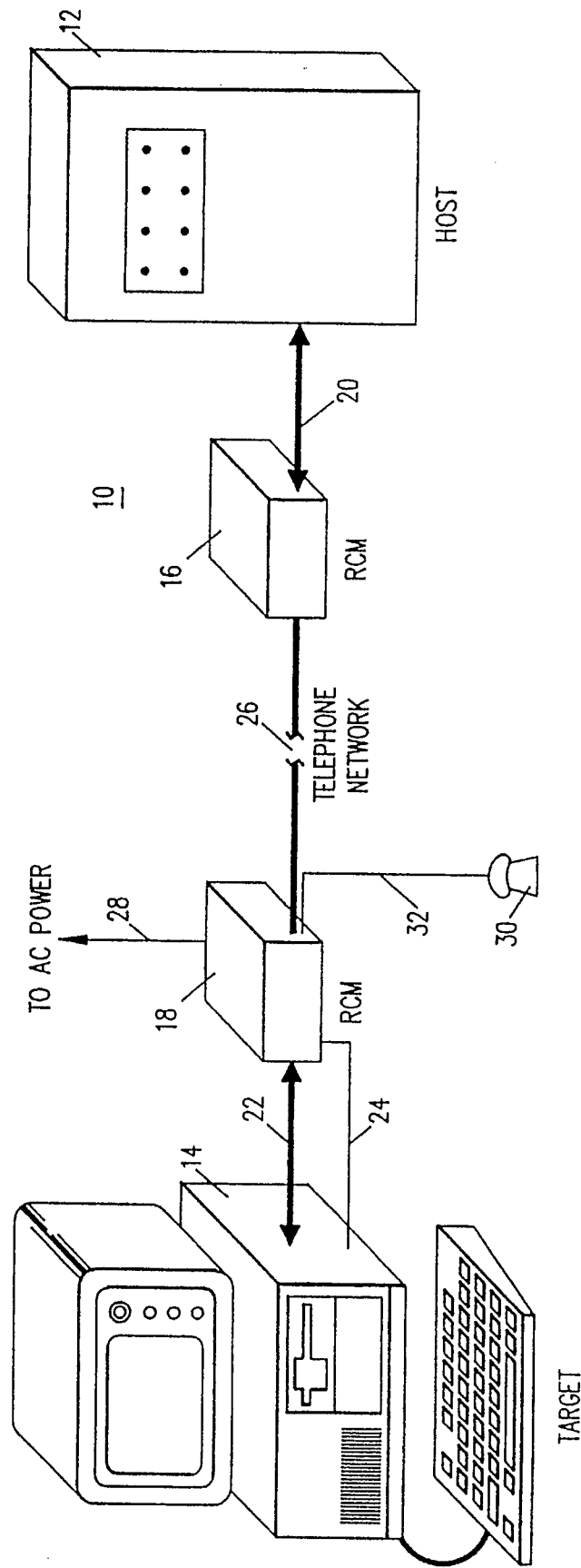
FIG. 1 is an illustration of the data communication system in which a remote control module of the present invention is employed.

Referring now to FIG. 1, software rental system 10 generally comprises host computer 12, target computer 14, remote control module (RCM) 16 associated with the host computer 12, and RCM 18 associated with the target computer 14. Communication between the host computer 12 and the target computer 14 and their respective RCMs 16 and 18 is accomplished via a standard serial RS232 communications link.

In operation, programs to be provided to authorized users on a rental basis are stored in the host computer 12. Typically, the host computer 12 is owned by a software rental service or company and is located at their offices. As shown in FIG. 1, the host computer 12 is connected to the public switched telephone network 26 via serial data line 20 RCM 16.

The target computer 14 is the computer of any user, and may be a workstation, minicomputer, or even a mainframe. However, for purposes of software rental, the most likely target computer is expected to be a personal computer, owned and operated by a user in a home or office setting.

The target computer 14 is connected to telephone network 26 via serial data line 22 and RCM 18. RCM 18 is also connected to a conventional source of AC power via power line 28, which also can be provided to the target computer 14 by RCM 18 via power line 24.

In operation, the host computer 12 can "dial up" the target computer 14 and, conversely, the target computer 14 can "dial up" the host computer 12. Functions of the host computer 12 include transmission of software to the target computer 14, request for and reception of customer usage data associated with the target computer 14 from RCM 18, and performance of various accounting and software rental business functions.

RCMs 16 and 18 and the methods for using them which are disclosed herein are intended to work with any type of host computer 12 and target computer 14. The software installed in the host computer 12 and the target computer 14 will, of course, be different for different types of computers, but the methods remain the same.

In accordance with the present invention, at any given time, the host computer 12 can communicate simultaneously with any number of target computers depending on the number of RCM's attached to, and the communications capacity of the host computer 12. Thus, by adding host computer RCMs and, if necessary, host computers, a virtually unlimited number of target computers 14 associated with RCMs 18 can simultaneously access rental software packages from the host computer(s).

Communication with the host computer 12 is an integral part of the software rental concept of the present invention, but the timing of communication of usage data to the host is not critical, since it is primarily for accounting and other administrative functions. Of course, the target computer(s) 14 can run rental software whenever and as often as the user desires.

Host computer 12 employs RCM 16 rather than merely a conventional modem to provide also for data integrity and program security. RCM 16 includes error detection circuits and data encryption modules for use in conjunction with communication from host computer 12.

Finally, as seen in FIG. 1, telephone 30 may be connected to RCM 18 via telephone line 32, using standard RJ11 modular plugs. In addition, a switch (not shown) may be provided on the front panel (not shown) of RCM 18 for use by the customer to select voice or data modes of communication. In the voice mode, telephone 30 can be used to conduct voice communication over telephone network 26.

In a user's system wherein the target computer 14 comprises a number of target computers on a local area network system, only one RCM 18 associated with the local area network system is required. The target RCM 18 is coupled via the public telephone network through the user telephone PBX system to the host computer RCM 16 or, alternatively, the user may install a separate telephone line dedicated solely to the target RCM 18. Each of the target computers on the local area network may then communicate with the target RCM 18 via the local area network. Optionally, a multiplexing apparatus (not shown) may be incorporated in the RCM 18 output circuitry thus allowing simultaneously use by several target computers on the local area network.

Figure 2:
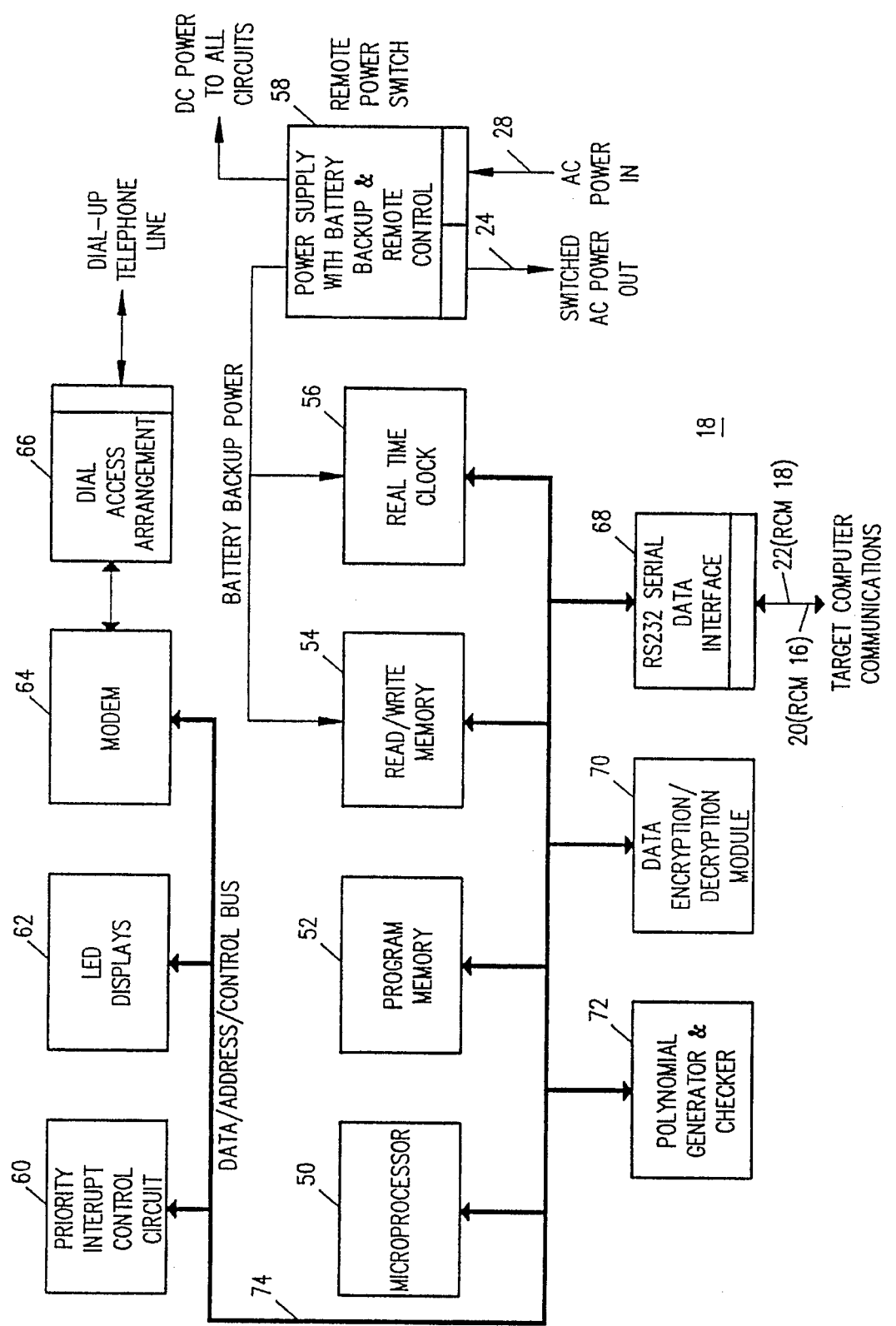
FIG. 2 is a block diagram of the remote control module employed in accordance with the present invention.
Figure 3A:
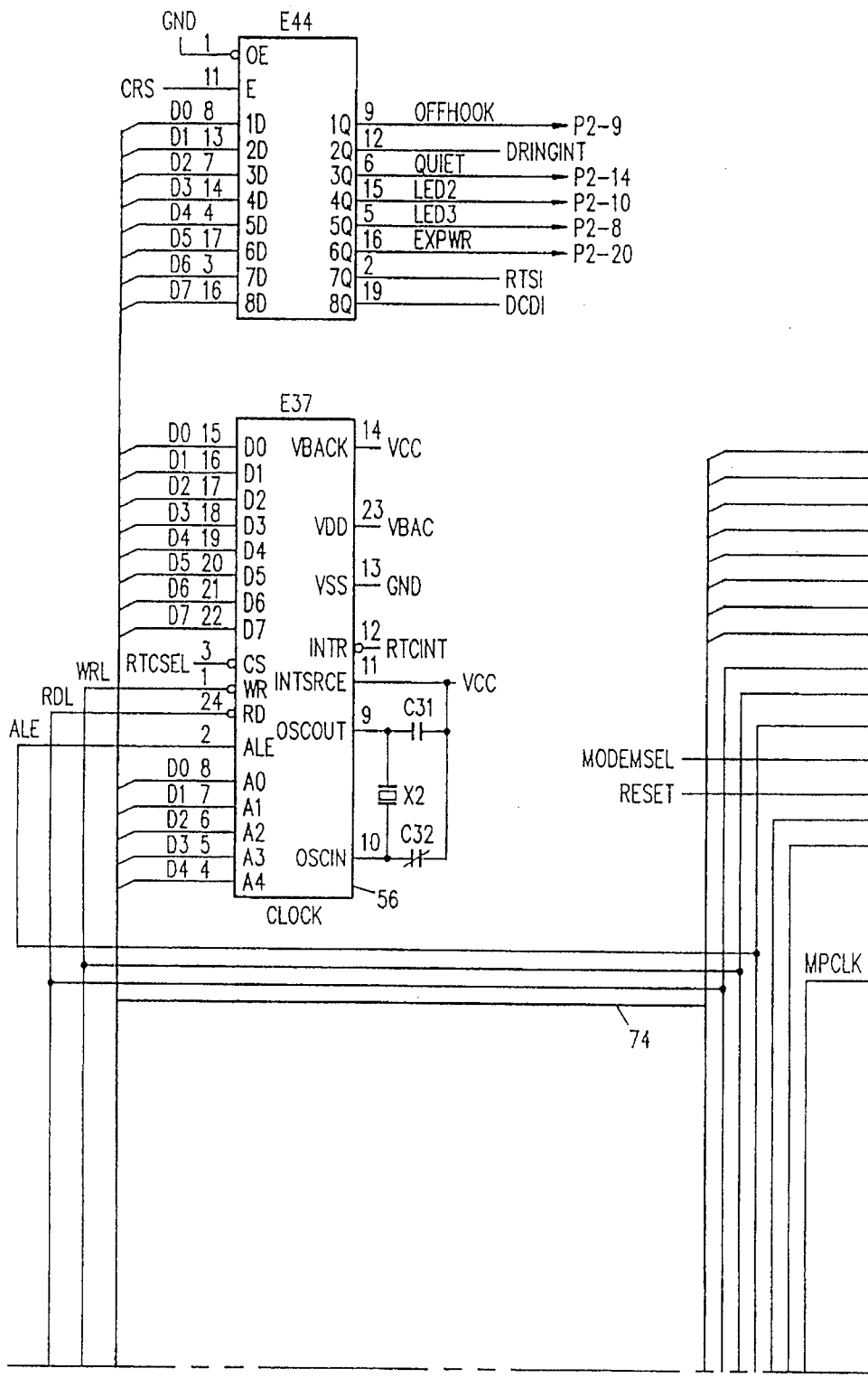
Figure 3B:
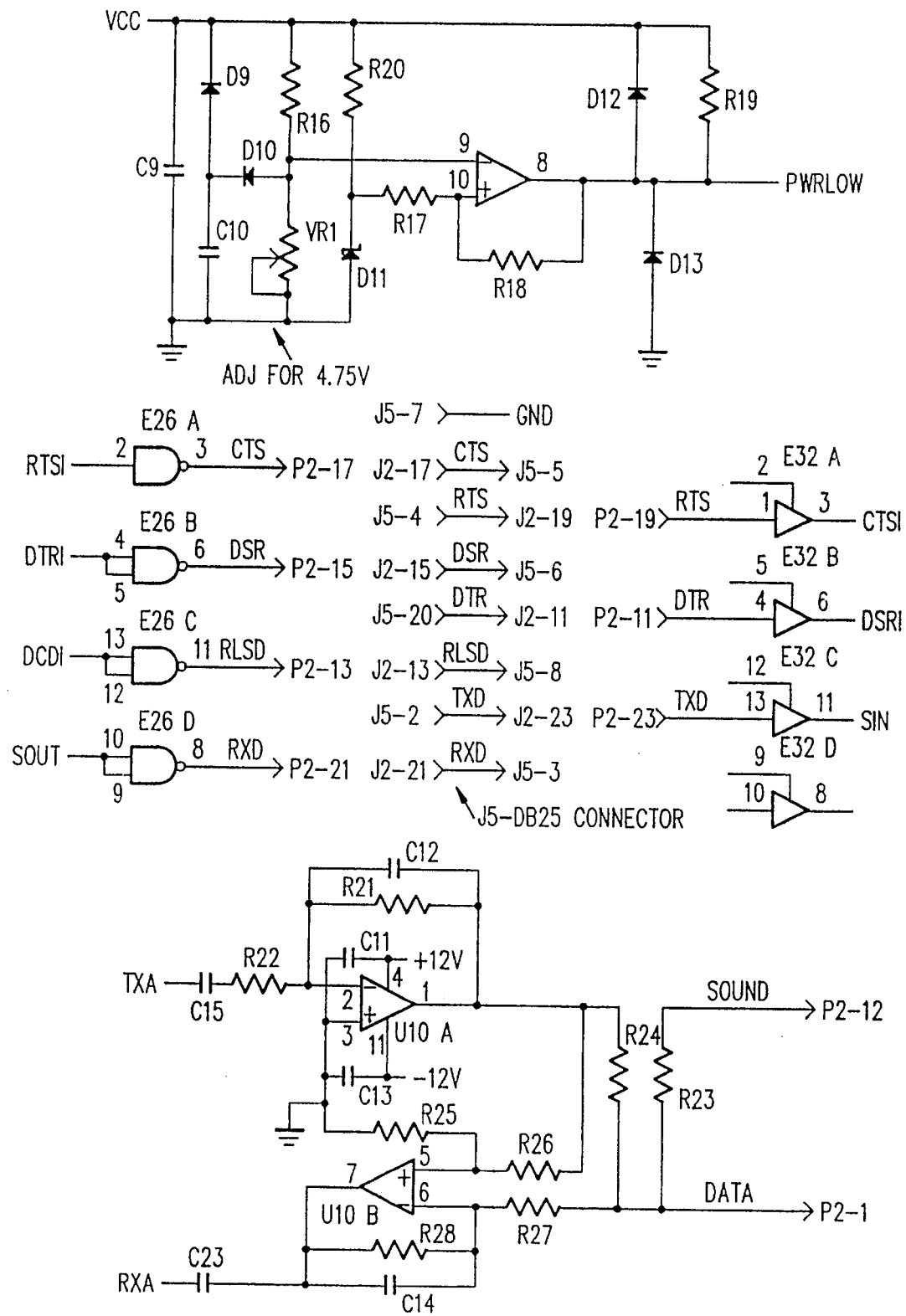

Referring now also to FIGS. 2, 3A and 3B, RCM 16 comprises microprocessor 50, program memory 52, read/write memory 54, real-time clock (RTC) 56, power supply 58, priority interrupt control circuit 60, light-emitting diode (LED) displays 62, modem 64, dial access arrangement (DAA) 66, RS232 serial data interface 68, data encryption/decryption module 70, and polynomial generator and checker (PGC) 72.

Microprocessor 50 is any conventional microprocessor, but may be a multiport integrated circuit device, such as an 8031 microprocessor, the ROM-less version of the 8051 microprocessor 50 (FIG. 2) and the speed of the communications link between the host computer 12 and the target computer 14 (FIG. 1 ) are not critical to systems constructed according to the principles of the present invention. Thus, while higher speed communication is typically superior to lower speed communication, the only requirement is that microprocessor 50 be fast enough to implement the various tasks that it is called upon to perform in its operating environment.

Program memory 52 is any conventional read-only memory (ROM) and is used to store the program executed by microprocessor 50 in performing the functions of RCM 18. An erasable/programmable read-only memory (EPROM), e.g., a 27128, may be used for program memory 52 when the modification of functions performed by RCM 18 may be desirable. However, an equivalent conventional ROM is acceptable and, typically, is a lower cost device.

Read/write memory 54 is, preferably, implemented by a Toshiba TC5565 static random access memory (RAM) having a capacity of at least 8 kilobytes. Back-up battery power is provided by power supply 58 to ensure that the contents of memory 54 are not lost if power to the RCM 18 is interrupted.

RTC 56 is, preferably, an ICM 7170 device manufactured by Intersil. The latter circuit maintains the date and time to the nearest 0.01 second. The occurrence of a leap year is automatically accommodated. RTC 56 is connected to the power supply 58 and receives battery backup therefrom in case of power failure. RTC 56 functions in a conventional manner to provide control and time information, upon request, to microprocessor 50. This enables the RCM 18 to perform its function of developing time, accounting and billing data relative to customer access to and use of programs initially stored in the host computer 12. Such time and billing data are provided to the host computer 12 by RCM 18 on command from the host computer 12.

Power supply 58 provides direct current power to the various other circuit elements of the RCM 18. In the event of a power failure or turning off of the AC power to the RCM 18, a "battery backup" feature of the present invention detects such condition, and the internal battery of RCM 18 provides battery backup power to the read/write memory 54 to protect data stored therein, and to RTC 56 to maintain operation thereof. In this manner, the contents of the memory 54 and the operation of the RTC 56 are not disturbed by a loss of AC power. Preferably, the internal battery of power supply 58 is a conventional rechargeable battery such as to preserve the contents of memory 54 and maintain operation of RTC 56 for several years, if necessary. Once AC power is restored to the system, the internal battery returns to its "wait" state, and power is not expended by the internal battery.

RCM 18 is provided with one standard 110 VAC output receptacle for receiving the standard electrical power plug for the target computer 14. The receptacle is relay-controlled so that switched AC power output is provided to the target computer 14 via power line 24. In this manner, target computer 14 can be turned on or off by RCM 18 for certain functions as described elsewhere in this specification. Device interrupts generated within RCM 18 of FIG. 2 are merged in priority interrupt control circuit 60, which comprises a 74LS348 integrated circuit chip. Microprocessor 50 supports only two priority interrupts, namely, INT0 and INT1. INT0 is unassigned and is available as a test point for use with various test equipment. All other interrupts are assigned to INT1. Since all of the devices of RCM 18 have separate interrupt enabling control, any or none of the device interrupts may be used. The nature and source of a particular interrupt is determined by reading terminals P10–P12 (as shown in FIG. 3A) of interrupt control circuit 60. Once an interrupt has occurred, its cause must be resolved by microprocessor 50, or the same interrupt will continue to recur. A summary of typical interrupts and their priorities is given in Table 1 below.

| Interrupt | Value of P10–P12 | Priority |
|---|---|---|
| Power low | 0 | Highest |
| Incoming ring | 1 | Next Highest |
| Modem Interrupt | 2 | Next Highest |
| UART | 3 | Next Highest |
| RTC | 4 | Next Highest |
| PGC | 5 | Lowest |

LED displays 62 comprise a number of single light emitting diode displays to indicate the status of certain conditions and the occurrence of certain events. Such conditions or events include power-on, power-off, and the status of communications activity. During diagnostic and test functions, the LED displays take on different meanings related to these functions.

Modem 64 includes modulation and demodulation circuitry for sending and receiving data over the public switched telephone network 26 (FIG. 1). Preferably, modem 64 is implemented by a 73K222 modem circuit (for 300, 600 and 1200 baud) or a 73K224 modem circuit (for 2400 baud) manufactured by Silicon Systems, Inc. However, other conventional modem circuits, including modem circuits supporting higher baud rates, can be used to implement the functions of modem 64. Moreover, since modem 64 can serve as a standard personal computer type modem when the target computer 14 is not engaged in accessing rental software, it is not necessary to include an additional modem for communication with other computer services or data base services.

Dial access arrangement (DAA) 66 provides for connection of RCM 18 to the public switched telephone network 26. DAA 66 connects private circuits to the public switched telephone network in compliance with FCC regulations, Part 68. Thus, DAA 66 includes transformer isolation, impedance matching circuits, ring detection circuits, voice/data switching circuits, hook relays and other well-known circuitry required for connecting to the public switched telephone network 26.

The serial data interface 68 is a conventional serial interface for communication in accordance with standard RS232 criteria. More specifically, interface 68 is, preferably, a universal asynchronous receiver/transmitter (UART), model SCC2691, for carrying on serial data communication between RCM 18 and the target computer 14. Thus, the interface 68 is coupled to a standard RS232 serial port of the target computer 14 via serial data cable 22. Data is transmitted serially between the target computer 14 and interface 68, whereas data is transmitted in parallel on bus 74 between interface 68 and microprocessor 50.

Further considering the serial link between interface 68 and the target computer 14, the clock for the serial port of the target computer 14 has a frequency equal to one-fourth the frequency of the internal clock of microprocessor 50 of RCM 18. Preferably, the frequency of the serial port clock of the target computer 14 is set to 2.7648 Mhz.

The baud rate between the RCM 18 and the target computer 14 may be any value, provided that the RCM 18 can buffer the data. The baud rate of the modem 64 is set to 300, 600 or 1200 baud, depending on the transmission method chosen.

Data encryption/decryption module 70 performs a decrypting function with respect to data received by RCM 18, from the host computer 12. Data decrypted by module 70 of RCM 18 was encrypted by a corresponding data encryption/decryption module in RCM 16 associated with the host computer 12 prior to transmission to the RCM 18. The encryption and decryption functions will be discussed in more detail herein below in connection with a more complete discussion of the software security technique employed by the present invention.

Polynomial generator/checker (PGC) 72 is, preferably, an SCN2653 device manufactured by Signetics, Inc. Preferably, RCM 18 generates block check characters (BCC) for each block of data to be transmitted by RCM 18 to the host computer 12. Correspondingly, each block of data received from the host computer 12 by RCM 18 is checked in accordance with the BCC. By way of a further preference, PGC 72 employs a CRC-16 polynomial code with an $X^{16}+X^{15}+X^2+1$ divisor. In this manner, all single-bit errors and most multiple-bit errors are detected. The CRC-16 polynomial is employed because the error codes generated are much more reliable than the normal "check sums" typically used. This is especially true for data transmitted over the public switched telephone network 26.

Since data communications using the public switched or dial-up telephone network 26 are notoriously error prone, special precautions are often taken to at least detect errors, if not correct them. More elaborate schemes can be used to correct the errors, and such error-correction coding schemes are not precluded by the present design of the RCM 18. However, for reasons of economy and speed in data communications, the preferred embodiment described herein performs error detection only. In the present system, a data block is simply retransmitted in the event of an error detection.

As generally discussed above, the error detection method employed herein involves the transmission of a specially generated 16-bit code at the end of each data block. The check code is generated by PGC 72 using the aforementioned CRC-16 polynomial with the aforementioned divisor. At the receiving end, the check code is, in effect, regenerated and compared to the actual check code received. If identity is not present, a transmission error has occurred and an error signal is generated by PGC 72. Once an error is detected, a request for retransmission is initiated and the data block will be retransmitted by the host computer 12 to RCM 18, or from RCM 18 to the host computer 12, as the case may be.

The check code employed herein can be mathematically shown to be very effective in detecting the types of errors that normally occur over public switched could be implemented, and would not require the use of PGC 72, but such schemes are not as effective for this application.

Accordingly, all communication between the host computer 12 and target computer 14 or RCM 18 employ the above-described error detection method with retransmission of data blocks upon detection of errors. In the latter regard, RCM 18 employs PGC 72 for checking data received from host computer 12, and a corresponding PGC in RCM 16 (FIG. 1) checks data received from the target computer 14 or RCM 18.

Certain applications of the system 10 (as shown in FIG. 1), in particular for the business of software rental, typically will be configured so that the host computer 12 sends and receives data/messages to and from the target computer 14 over the public switched telephone network 26. As also indicated above, RCMs 16 and 18 serve as interface devices to connect the host computer 12 and the target computer 14, respectively, to the telephone network 26. Obviously, while designed to work with the public switched telephone network the present invention can be configured to work with any communications link between the host and target computers.

The circuit configurations of RCMs 16 and 18 are identical. The operation of the RCM 18 associated with target computer 14 and the operation of RCM 16 associated with host computer 12 is determined by program instructions executed by microprocessor 50.

RCMs 16 and 18 provide serial communication, via RS232 serial data interface 68, to the host computer 12 and target computer 14, respectively, each of which is preferably located within a short-distance (i.e., a few feet) of its respective RCM. Whereas a single RCM 18 is required for each target computer 14, a plurality of RCMs 16 may be used with host computer 12. In fact, the number of RCMs 16 must be equal to the number of simultaneous data-transmission links between the host computer 12 and target computers 14 (to download software) or RCMs 18 (to upload usage and accounting data). In this manner, the host computer 12 can carry on data conversations with several target computers 14 simultaneously.

When a customer contracts to participate in the rental software system, the software rental company will provide the customer, either through sale or rental, with RCM 18 for connection to and association with the customer's target computer 14. Installation of the RCM 18 is easily performed by the customer. Referring again to FIG. 1, RCM 18 is connected to the public telephone network 26 by means of a standard RJ11 type modular telephone cord extending between RCM 18 and the telephone system jack. In addition, RCM 18 is connected to the target computer 14 via a serial data cable 22 and power cable 24, RCM 18 deriving its power from a conventional AC power source via cable 28. As an option, telephone (or telephone handset) 30 may also be connected to RCM 18 via telephone cable 32 utilizing standard RJ11 modular plugs. Thus, when RCM 18 is not being used for data communications, the telephone 30 can be used for normal voice communications. When data communications involving RCM 18 are to take place, RCM 18 performs automatic switching so as to break the connection between telephone 30 and telephone network 26, and to establish connection between DAA 66 (FIG. 2) and the network 26.

During preprogrammed times, as established by the software of the host computer 12 and transmitted to RCM 18 and stored in memory 52 of RCM 18, RCM 18 will initiate an "automatic answer" mode of operation so that it may respond to messages received front the host computer 12. Such communications between the host computer 12 and the target computer 14 normally occur at night so as to take advantage of low telephone rates in effect at that time, and also to avoid conflicts with other data transmission functions of target computer 14.

The RCM 18 can also be used as a standard modem for the target computer 14, and can be set up to communicate with remote computer or other database services. RCM 18 distinguishes between its usage as a standard modem and its usage as a special remote control module for controlling access to rental software.

During the time that RCM 18 is not performing data communications and is not set up in its "automatic answer" mode, telephone 30 (if one is attached) is available for normal use, and will ring in the usual way when called.

One feature of tim proposed software rental system is the ability to download software from the host computer 12 to target computer 14 during off-peak hours, such as late at night. Preferably, the customer will not be compelled to participate in or supervise the downloading of software during such late-night hours. Thus RCM 18 is able to control the AC power provided to the target computer 14 in response to control signals from the host computer 12. In order to enable this feature of the present invention, the on/off switch of target computer 14 is left in the "on" position, and the power cable 24 (FIG. 1) of target computer 14 is plugged into a receptacle 102 at the rear of RCM 18, RCM 18 being connected via its own power cord 28 to an AC power source, as previously described. Preferably, the front control panel of RCM 18 is provided with an on/off switch so that the customer can turn on or turn off the target computer 14 manually. However, this switch is preempted when RCM 18 receives a command from the host computer 12 to turn on the target computer 14 for late-night operation.

Accordingly, when downloading of software is desired, the host computer 12 calls the target computer 14, and once the call is acknowledged by RCM 18, the host computer 12 turns on the target computer 14 by actuating the AC power switch in power supply 58 (FIG. 2). When the target computer 14 is turned on by RCM. 18 at the command of the host computer 12, the host computer 12 can download software to a storage device (not shown) associated with the target computer 14. In addition, for reasons described below, a special patch for the target computer 14 operating system, which is required to run the rental software, is also downloaded (if not previously downloaded) from the host computer 12 to the target computer 14. Once the software downloading process is complete, the host computer 12 commands RCM 18 to turn off power to the target computer 14.

Power to non-essential external peripheral devices associated with target computer 14, such as a printer, a display device and the like, need not be controlled through RCM 18 since the downloading process does not require the use of such external peripherals. However, if desired, such external peripheral devices may be controlled through the RCM 18 by making appropriate power connections to the RCM 18.

Referring again to FIG. 2, RCM 18 contains a program memory 52 and a read/write memory 54. The program memory 52 holds the program instructions which microprocessor 50 implements in order to accomplish the functions of RCM 18. Read/write memory 54 holds the accounting data relating to software rental by the user of the target computer 14, and also provides buffer storage for communications messages passing between the host computer 12 and the target computer 14. Read/write memory 54 may also store other ancillary data.

RTC 56 is included in RCM 18 in order to provide a real-time time-base, including exact year, month, day and time. Preferably, accuracy is to the nearest 0.01 second. The setting of RTC 56 with the year, month, day and time is strictly controlled by the host computer 12 using security techniques available to it through data encryption/decryption module 70.

Overall, RCM 18 is a real-time controller that can be called into action independently by host computer 12, target computer 14, a change of state of the power switches of RCM 18, and other internal conditions. Accordingly, an interrupt system is designed into the operation of RCM 18, and is used to enable microprocessor 50 to manage these independently occurring real-time events. The management of interrupts by microprocessor 50 is assisted by priority interrupt control circuits 60.

An important aspect of the present invention concerns security for rental software executed by the target computer 14 (FIG. 1). This software security function is provided by the cooperation of data encryption/decryption module 70 in RCM 18 with a corresponding data encryption/decryption module in RCM 16 associated with the host computer 12. Closely coupled with the function of providing software security is the function of keeping track of and accounting for the time periods during which the target computer 14 is using the rental software on which the rental charges are based.

In at least some instances, the rental software provided by the host computer 12 may have a very large amount of code and many data files. Of course, it is not necessary to provide security or protection for each and every component or module of most rental programs. In accordance with the present invention, a particularly critical module—hereinafter referred to as the "key module"—in each rental program is identified. The key module, according to the present invention is essential to program execution and without which the overall rental program will not run.

In addition to identification of the key module, the security of rental software according to the present invention also requires a special version of the operating system to be utilized in the target computer 14. The special version of the target computer operating system is created by a patch module, hereinafter "operating system patch module" or "OSP" module (the OSP is identical for all rental software executed on target computers of the same or similar type), which is downloaded to the target computer 14 along with the rental software. The OSP module initiates decryption of the encrypted key module of the rental software package by module 70 of RCM 18, then loads the decrypted key module into the internal memory (not shown) of the target computer 14 for execution. In addition, periodically while the rental software package is running, the OSP module communicates with the RCM 18 to provide verification that it is still connected to the target computer 14 for security and accounting purposes.

The key module is encrypted using the Federal Information Processing Data Encryption Standard No. 46, well-known to those of skill in the art, by the data encryption/decryption module 70 of RCM 16. When the rental software is transmitted by the host computer 12 over the telephone network 26, the encrypted key module and the associated OSP module are transmitted as well. Alternatively, the encrypted module, the OSP module and the unencrypted remainder of the rental software may be sent to the customer on floppy disks, optical disks, a compact disk ROM, for example, or magnetic tape by mail or other delivery service. If utilizing a magnetic or optical disk drive, the target RCM 18 would also incorporate a well-known SCSI drive interface thus allowing the encrypted software and data to be accessed via the RCM 18. When downloaded from the host computer 12 or loaded from media otherwise provided by a software rental service, the entire rental software package (including the encrypted key module and OSP module) is stored in a peripheral storage device (e.g., hard disk or floppy disk) associated with the target computer 14.

Further referring to the encryption process of the present invention, data encryption/decryption module 70 of RCM 16 uses an encryption key unique to the individual target computer in which the rental software is to be used. Methods of encrypting and decrypting using an encryption key, such as described in U.S. Pat. No. 4,649,233, are well-known. However, since the encryption key is an important element which the software security scheme of the present invention depends, the encryption key itself is always transmitted in encrypted form to RCM 18 (utilizing an encryption key identical to the encryption key provided in RCM 18) to assure proper systems operation and integrity. When transmitted from RCM 16, the encryption key is then automatically decrypted as it is received by RCM 18 using a second, special key built into RCM 18 which is unique to each individual RCM 18. The decrypted encryption key is then stored in the RCM memory 52 until decryption of a key module is required. Since the encryption key is retained in memory 52, the encryption key need only be transmitted to RCM 18 one time. If the RCM 18 is tampered with in any manner, the encryption key is destroyed. Without the encryption key, decryption of the key module of the rental software at tim target computer 14 is essentially in, possible, and use, copying, vandalizing or modification of the rental software is prevented. The security technique employed by the present invention also provides a high degree of protection during downloading of the package via the public telephone network 26 owing to encryption of the key module and of the encryption key.

As described above, decryption of the key module is performed in the data encryption/decryption module 70 of RCM 18. The encryption key used in the decryption process is inaccessible to the user. Thus, in accordance with the present invention, a downloaded rental software package will only run on the particular target computer 14 having an encryption key corresponding to the encryption key employed by the host computer 12 when the key module of the rental software package was encrypted. Since the rental software will operate only on a target computer 14 serviced by an RCM 18 utilizing an encryption key unique to the target computer 14 (to decrypt the key module), no other physical or licensing restrictions on the user's ability to make copies of the rental software package are required.

Prior to a customer executing a rental software package on a target computer, the software package will have been transmitted electronically or by other suitable means and be resident in a peripheral storage device associated with the customer's target computer. The rental software package will have the corresponding OSP module appended and the original key module will be replaced with an identical encrypted key module.

Assuming that a customer wishes to run a renal software package protected in accordance with the present invention, the user follows exactly the same procedures for loading the software package from the associated peripheral storage device to the internal memory of target computer 14 as if an unrented version of the same package were being run. However, in a manner transparent to the user, when the key module of the software package is retrieved from the peripheral storage device of target computer 14, the OSP software module is activated. The OSP module fetches the encrypted version of the key module from the peripheral storage device (not shown) and sends it to the RCM 18 for decryption by the encryption/decryption module 70. After decryption, the key module is sent back to the target computer 14 and loaded into its internal memory (RAM) for execution. At the latter step the OSP module also initiates a timer controlled by the RTC 56 to begin recording the actual use time of the rental program for computation of rental time charges.

The renal program with the decrypted key module now stored in the internal memory of target computer 14 will operate in exactly the same manner as it would if it were not a renal package (i.e., the same way as if it were a purchased program). However, when execution of the renal program is complete, control reverts back to the OSP module. The OSP module then automatically erases the renal program including the key module from the RAM of target computer 14 and notifies RCM 18 that the period of use or renal period has stopped. The elapsed time between the starting and stopping of the renal program, as well as the time and date information, are recorded in memory 54 of RCM 18 for subsequent, off-line processing.

It is essential that the RCM 18 be connected to the target computer 14 at the time that the renal period ends. Connection of RCM 18 to the target computer 14 insures that the exact time of termination of the renal period is recorded. Furthermore, to maintain proper security of the renal software in accordance with the present invention, while the renal software package is running, periodically control is passed to the OSP module upon the occurrence of certain periodic events, disk access by the target computer 14 operating system for example. The OSP module then executes routines to prevent circumvention of the rental accounting for use of the rental software package, and to protect the rental software package from theft, vandalism or other unauthorized modification. In particular, the OSP module then queries RCM 18 and verifies, through its response, that RCM 18 is, in fact, connected to the target computer 14. If it is, execution of the rented software continues; if it is not, the execution is terminated by the OSP module and the entire rental software program is erased from the target computer 14 RAM.

It should be noted that the rental software package itself may be modified by adding code to ascertain that the RCM 18 is connected to the target computer 14 rather than modifying the operating system by adding the OSP module for receiving control from the rental software package. However, since modifying the rental package is difficult without assistance from the developers of the package, adding the OSP module is preferable. Therefore, an operating system, so patched, must be used when executing rental software according to the present invention. As described above, the OSP module is downloaded with the rental software package, if it has not already been downloaded earlier with another software package.

The software security scheme of the present invention involves encryption of only the key module of the rental software in a predetermined algorithmic manner using an encryption key. Further, the encryption key itself is encrypted and transmitted by the host computer 12 separately. No changes to the functions of the rental software are made during the encryption process. Thus, any software package may be rented without technical involvement of the software vendor, and all of the security procedures are transparent to the user.

In accordance with the present invention, microprocessor 50 in RCM 18 is programmed to destroy an encryption key if: (1) the RCM 18 is physically tampered with; (2) the telephone number of the target computer 14 is changed without notice or the telephone is disconnected for longer than a preselected period of time (in this case, destruction of the protection key takes place only after power is restored). If the encryption key is destroyed by the RCM 18, RCM 18 will attempt to notify the user by using a special alarm, such as a beeping sound or LED display. The host computer 12 also will be automatically notified by RCM 18, if possible. Restoration of the encryption key is then possible at the option of the rental software company.

Referring now also to FIG. 4, another preferred embodiment of the present invention providing a video game software rental system is illustrated. Video game system 11 comprises central or host computer 12, remote control module (RCM) 29 associated with host computer 12, target game computer 15, television or monitor 13, RCM 21 associated with the game computer 15, interface cartridge 27 coupling the RCM 21 to the game computer 15 and game control input device 19. Similarly, as described hereinabove with regard to FIG. 1, communication between the host computer 12 and the game computer 15 and their respective RCMs 29 and 21 is accomplished via a standard serial RS232 communication link or other suitable communication link. In operation, the host computer 12 is linked to the game computer's RCM 21 via the host RCM 29 and the public switched telephone network 26. Typically, available game software is stored in the host computer 12 which is centrally located in order to provide rental service to a large number of authorized users.

The target game computer 15 may be any of several well-known video game computer systems, such as that manufactured by Nintendo Company, typically owned and utilized by a user in a home or recreational setting in combination with a television or monitor. The game computer 15 conventionally utilizes readily available plug-in ROM game cartridges (not shown) which a user purchases. The game computer 15 and hence the progress of the game being played is controlled by well-known control devices 19 such as a joy stick or a combination of rocker switches and buttons. The output of the game computer is coupled to the television 13 via cable 31 and typically comprises video and audio signals generated by the game computer 15 under the control of the game software and the user via user input device 19. AC power adapter 25 provides power to the game computer 15.

Figure 5:
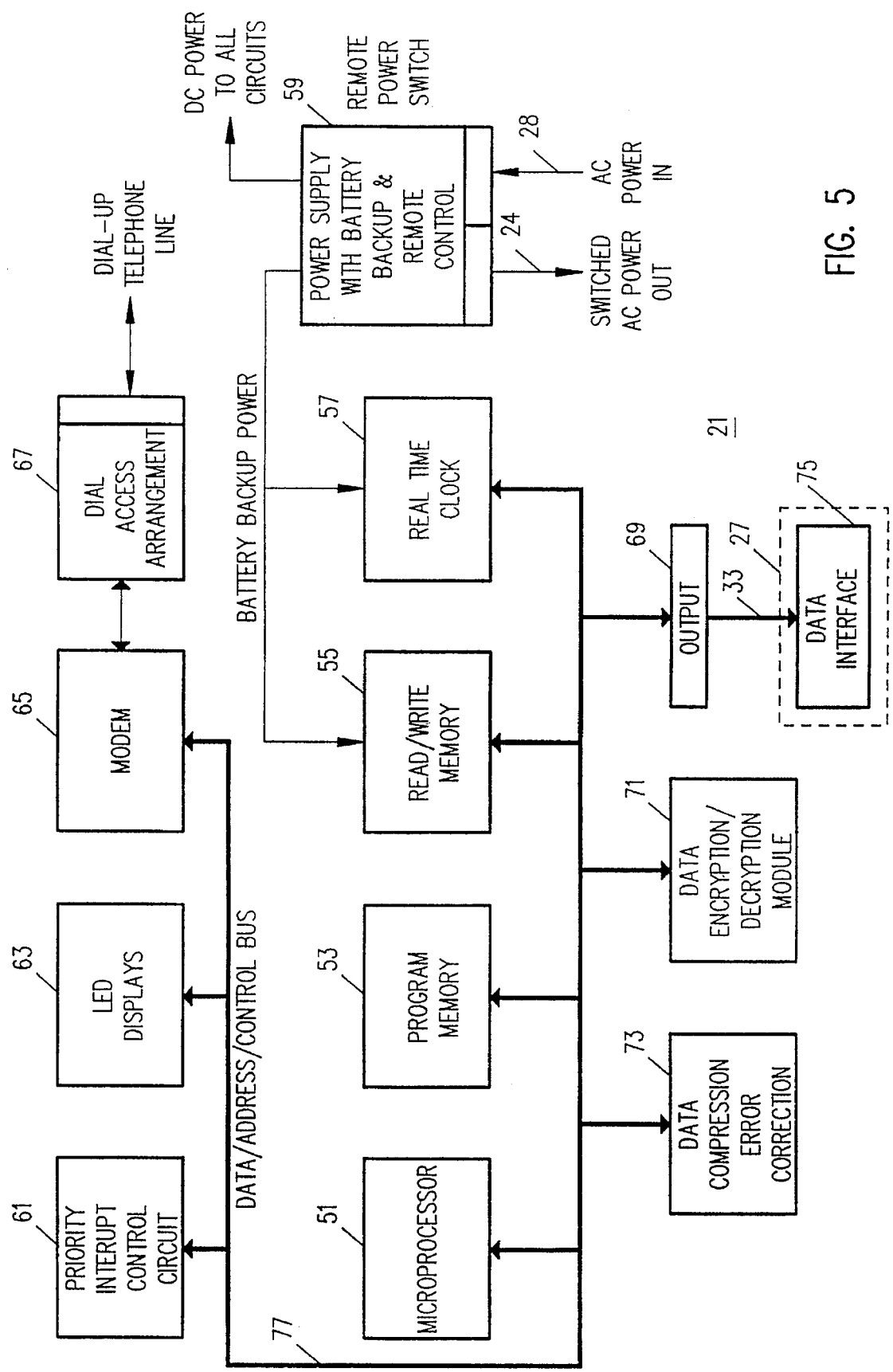

Referring now also to FIG. 5, RCM 21 comprises microprocessor 51, program memory 53 (RAM) read/write memory 55 (also RAM), real-time clock (RTC) 57, power supply 59, priority interrupt control circuit 61, light-emitting diode (LED) displays 63, modem 65, dial access module (DAA) 67, input/output (I/O) connector 69, data encryption/decryption module 71 and data compression and error correction module 73. Both RCMs 21 and 29 operate similarly to RCMs 16 and 18 as described hereinabove with reference to FIGS. 2, 3A and 3B and only the differences in operation and detail therebetween will be further described herein. RCM 21 is coupled to the game computer 15 via I/O connector 69, data cable 33 and data interface module 75. The data interface module 75 is incorporated in a plug-in cartridge 27 adapted for use with the cartridge slot provided in the game computer 15 console. The data interface module 75 may comprise an RS232 serial data interface or other suitable data interface as required by the particular game computer 15 utilized by a user. The dam interface module utilized in RCM 29 associated with the host computer 12 comprises an RS232 serial data interface 68 as described hereinabove with regard to RCM 16 and FIG. 2.

When a customer contracts to participate in the video game software rental system, the software rental company will provide the customer, either through sale or rental, with RCM 21 and plug-in interface cartridge 27 for connection to and association with the customer's game computer 15. The type plug-in interface cartridge 27 provided is determined by the particular game computer 15 utilized by the customer. Referring again to FIGS. 1 and 4, RCM 21 is connected to the public telephone network 26 by means of a standard RJ11 type modular telephone cord extending between RCM 21 and the telephone system jack (not shown). The RCM 21 is connected to the game computer 15 via a serial dam cable 33 and switched power cable 24 integrated therewith. In addition, RCM 21 is connected to a conventional AC power source via power cable 28. A dedicated telephone line may be provided for RCM 21 or, alternatively, a common telephone line may be shared between telephone 30 and RCM 21. Thus, when RCM 21 is not being used for data communications, the telephone 30 can be used for normal voice communications. When data communications involving RCM 21 are to take place, RCM 21 performs automatic switching so as to break the connection between telephone 30 and telephone network 26 (as shown in FIG. 2), and to establish connection between DAA 67 and the telephone network 26.

The RCM 21 comprises a real time communications controller that can be initiated independently either by the host computer 12 or by the customer or user via game computer 15. When a user desires to have a selected video game software downloaded, the user initiates RCM 21 via the game computer 15 thus establishing a communications between RCM 21 and the host computer 12. Game software downloaded to RCM 21 in accordance with the user's instructions is stored in the read/write memory 55 for immediate and future use by the customer. Transfer or uploading to the host computer 12 of billing and usage data stored in the read/write memory 55 is initiated by tim host computer 12 as described hereinabove. Billing and usage dam is uploaded to the host computer 12 each time game software is downloaded. Further, host computer 12 may initiate RCM 21 at preprogrammed times automatically for uploading of billing and usage dam.

When a user desires to play a video game, the user turns on the game computer 15 and RCM 21 via switched power cable 24. A game menu providing a list and description of available game software packages is called up and displayed on the television 13 screen. The menu is stored in read/write memory 55 and is periodically updated by host computer 12. The user selects a desired video game from the menu via input device 19. If the selected video game has already been downloaded from the host computer 12 and stored in read/write memory 55, the selected video game software is retrieved by the game computer 15 for use and usage data stored in read/write memory 55. If the selected game software is not already stored in read/write memory 55, the user initiates communications with the host computer via RCM 21. The desired video game software is then downloaded and stored in read/write memory 55 and the communications link with the host computer 12 terminated. The game computer 15 then retrieves the selected video game software for use. Since it is not required that the RCM 21 be linked to the host computer 12 except during the time that game software is actually being downloaded, charges for use of the telephone network are not incurred during the time the user is actually playing the selected video game.

Security of and prevention of unauthorized use for the rental game software downloaded by the host computer 12 is provided by the cooperation of the data encryption/decryption module 70 in RCM 29 and the data encryption/decryption module 71 in RCM 21. Closely associated with the function of providing rental software security is the function of keeping track of an accounting for the time periods during which the game computer 15 is utilizing the game software on which the original charges are based. Each game software package for each different game available for rental is assigned an 8-character package identifier code which is unique to the particular game provided by the game software package. Each software package is encrypted with a package key, the package key being the unique package identifier associated with each different game available. The entire software package may be encrypted or only selected critical portions or modules of the software are encrypted as described hereinabove. When a user signs up for a particular package, the package key associated with the software package is downloaded to the RCM 21 associated with the user's game computer 15. To protect the package identifier from unauthorized access while in transmission, the package identifier is encrypted for transmission utilizing a unique user identifier code to encrypt the package key. A unique user identifier code is assigned to each user contracting with the software rental system and is stored in RCM 21 associated with the user's game computer 15. Since all game software packages associated with a particular game are identically encrypted, a particular game software package is required to be encrypted and fully tested once only thus allowing duplicate software packages to be provided, such as on floppy disk or compact optical disk, for inventory. Once an encrypted game software package has been downloaded from the host computer 12 or otherwise input to the RCM 21 and stored in read/write memory 55, it may be retrieved and used repeatedly as long as the user is authorized. As described hereinabove, the video game software may be mailed to a user for use with peripheral devices such as magnetic or optical disk drives coupled to RCM 21.

Typically a video game will comprise at least 200,000 bytes of data. In order to store a useable number of different video games, read/write memory 55 must have sufficiently large capacity, necessitating large blocks of addressable RAM. Read/write memory 55 may be a solid state memory block or, alternatively, may be an external storage module such as a magnetic disk drive. Further, because of the relatively large software programs be used, the data transmission rate becomes critical to the success of a video game rental software system. Well-known data compression techniques may be employed to reduce the transmission time required for downloading the game software packages. For a data transmission of 9,600 baud, the transmission time for 200,000 bytes is at least 200 seconds, or 3.3 minutes. Utilizing presently known data compression techniques allows the transmission time for this example to be reduced to approximately 1 minute. As discussed hereinabove, error correction techniques are utilized to compensate for the relatively high data error rates encountered with the public telephone networks.

While preferred forms and arrangements have been described in illustrating the present invention, it is to be understood that various changes in detail and arrangement may be made without departing from the spirit of the present invention or from the scope of the appended claims.

What is claimed is:

1. Apparatus for remotely controlling and monitoring the use of a computer game program comprising:

first and second computers, said first computer having storage memory for storing computer game programs, and having communication circuits for communicating with said second computer for downloading said computer game programs to said second computer and for monitoring the use of said computer game programs by said second computer, said first computer remotely controlling said second computer to transmit at predetermined times data indicating elapsed time of use of said downloaded computer game programs;

said communication circuits including a first transmitter and receiver at said first computer, and a second transmitter and receiver at said second computer;

said first transmitter and receiver and said second transmitter and receiver including a microprocessor for control thereof, a program memory for storage of a program executed by said microprocessor, a read/write memory, a real time clock for enabling measurement of elapsed time of use of said downloaded computer game programs, and a modem for sending and receiving data;

an interface device coupled between said second computer and said second transmitter and receiver for adapting said second transmitter and receiver to said second computer, said second computer being provided with a slot for receiving computer game cartridges, said interface device formed as a plug-in adapter that mates with said slot provided in said second computer;

an encryption device coupled to said first computer and to said first transmitter and receiver for encrypting at least one preselected portion of downloaded computer game programs to be transmitted from said first transmitter and receiver to form an encrypted information module, said encryption device including a first encryption key for encrypting said encrypted information module, said preselected portion including at least one portion of a computer program essential to the correct execution thereof;

a decryption device coupled to said second transmitter and receiver for decrypting said encrypted information module to form a decrypted information module, said decryption device including a copy of said first encryption key for decrypting said encrypted information module; and a transfer circuit for transferring said decrypted information module to said second computer for execution by said second computer and for deleting said decrypted information module from said second computer when execution by said second computer of the received program and program information is entirely completed.

2. Apparatus as in claim 1 wherein said first and second transmitter and receiver are coupled to each other via a public communication network.

3. Apparatus as in claim 2 wherein said first and second transmitter and receiver each include connection circuits for connecting said first and second transmitter and receiver, respectively, to said public communication network.

4. Apparatus as in claim 3 further including a telephone coupled to said connection circuits associated with said second transmitter and receiver, said connection circuits including circuits for connecting said telephone to said public communication network when said transmitter and receiver is not receiving the downloaded computer game program and said transmitter is not transmitting said time accounting information.

5. Apparatus as in claim 1 further including a monitor coupled to said transfer circuit for recording time accounting information from the time said decrypted information module is transferred to said second computer, until said decrypted information module is deleted from said second computer by said transfer circuit.

6. Apparatus as in claim 5 further including:

a time accounting memory coupled to said monitor for storing said time accounting information, said second transmitter and receiver being responsive to a command from said first computer for transmitting said time accounting information to said first computer;

an error detector coupled to said first transmitter and receiver for detecting the presence of an error in said time accounting information transmitted by said second transmitter and receiver and for producing an error signal; and a retransmitter coupled to said error detector and responsive to said error signal for producing a signal representing a request for retransmission of said time accounting information, said second transmitter and receiver responsive to said request for retransmission for retransmitting said time accounting information.

7. Apparatus as in claim 1 further including:

a second encryption key included in said encryption device for encrypting said first encryption key to form an encrypted first encryption key; and a copy of said second encryption key included in said decryption device for decrypting said encrypted first encryption key.

8. Apparatus as in claim 1 wherein:

said decryption device in said second transmitter and receiver comprises circuits for decrypting the encrypted information module in response to request of a user of said second computer to use the downloaded computer game program, said second transmitter and receiver thereupon transmits the decrypted information module to said second computer.

9. Apparatus as in claim 1 further including:

an error detector coupled to said second transmitter and receiver for detecting the presence of an error in the downloaded computer game program transmitted by said first transmitter and receiver and for producing an error signal; and a retransmitter coupled to said error detector and responsive to said error signal for producing a signal representing a request for retransmission of the downloaded computer game program transmitted by said first computer, said first transmitter and receiver being responsive to said request for retransmission for retransmitting the downloaded computer game program.

10. In a system having a central game memory for storage of computer game programs, and having communicating circuits for communicating with a game computer for downloading said computer game programs to said game computer and for monitoring the use of said computer game programs by said game computer, said game computer being controlled to transmit data indicating elapsed time of use of downloaded computer game programs, a remote control device for controlling and monitoring the use of said downloaded computer game programs, said remote control device comprising:

a microprocessor for control thereof, a program memory for storage of a program executed by said microprocessor in control of said remote control device, a read/write memory, a real time clock for enabling said remote control device to provide elapsed time of use of said downloaded computer game programs, and a modem for sending and receiving data;

first coupling means including an adapter device coupling said remote control device to said computer for transferring preselected portions of said computer programs that include encrypted portions between said remote control device and said game computer;

said adapter device coupled between said remote control device and said game computer for adapting said remote control device to said game computer, said game computer being provided with a slot for receiving computer game cartridges, said adapter device being formed as a plug-in cartridge adapted for use with said slot provided in said game computer;

a monitor coupled to said first coupling means for monitoring usage of said computer game programs in said game computer and for developing time accounting data relative to said usage; and decryption means coupled to said first coupling means for decrypting preselected encrypted portions of said computer game programs, said decryption means including a first encryption key for use by the decryption means in decrypting said preselected encrypted portions of said computer game programs, said first coupling means transferring said preselected encrypted portions of said computer game programs from said game computer to said decryption means when said computer game programs are loaded into said game computer, said decryption means decrypting said preselected encrypted portions of said computer game programs, said first coupling means transferring said decrypted preselected portions of said computer game programs from said decryption means to said game computer for execution, said monitor monitoring the usage of said computer game programs.

11. A remote control device as in claim 10 further comprising:

second coupling means coupling said remote control device to a host computer via a communications link; and a transmitter and receiver coupled between said first and second coupling means and to said monitor for receiving preselected computer programs transmitted from said host computer for further transfer to said game computer, said transmitter and receiver responsive in conjunction with said monitor to a first command transmitted by said host computer to transmit said time accounting data relative to said usage from said monitor to said host computer.

12. A remote control device as in claim 11 wherein said monitor includes realtime clock means for providing timing information and generating a signal for use in said remote control device.

13. A remote control device as in claim 12 wherein said monitor further includes memory means for storing said time accounting data, said transmitter responsive at preprogrammed times to said signal to transmit said time accounting data to said host computer.

14. A remote control device as in claim 11 wherein said decryption means further includes a second encryption key for use by said decryption means in decrypting said first encryption key, said first encryption key transmitted from said host computer in an encrypted format.

15. A remote control device as in claim 11 further comprising an error detector for detecting the presence of an error in block of said preselected computer programs transmitted from said host computer and for generating an error signal when an error is so detected.

16. A remote control device as in claim 15 wherein said error detector includes error correction means for generating error-correction signals to correct any errors so detected in said preselected computer programs.

17. A remote control device as in claim 15 wherein said error detector includes retransmission means responsive to said error-correction signals to generate a retransmission request signal, said host computer responsive to said retransmission request signal for retransmitting said blocks of computer programs containing errors.

18. A remote control device as in claim 11 wherein said transmitter and receiver comprises a modem and said communications link comprises a public network.

19. A remote control device as in claim 10 wherein said decryption means includes a second encryption key for use by said decryption means in decrypting said first encryption key.

20. A method of providing computer game programs to authorized users on a rental basis, said method comprising the steps of:

establishing a connection between a host computer having computer game programs stored therein and said game computer by way of an interface device formed as a plug-in adapter that mates with a game cartridge slot provided in said game computer;

selecting a computer game program to be used on a rental basis at said game computer;

selecting a key module of said selected computer game program that is essential to the operation of said selected computer game program, said selected computer game program not operable without said key module;

encrypting said key module in said host remote control module with a first encryption key;

encrypting said first encryption key and transmitting said first encryption key to said game computer separately;

downloading said selected game computer program, including said encrypted key module, to said game computer remote control module along with an operating system modification routine;

modifying the operating system of said game computer utilizing said operating system modification routine, said operating system modification routine including a procedure for initiating the decryption of said key module;

decrypting said first decryption key at said game computer;

fetching said encrypted key module of said game computer program;

sending said encrypted key module of said computer game program to a decryption means associated with said game computer;

decrypting said encrypted key module under the control of said operating system modification routine to form a decrypted key module, utilizing said first encryption key in said decryption means associated with said game computer;

transferring said decrypted key module from said decryption means to said game computer for execution as part of said game computer program; and deleting said decrypted key module from said game computer when execution of said game computer program is complete, said operating system modification routine initiating said deletion of said decrypted key module.

* * * * *